United States Patent
Gonzales

(10) Patent No.: US 10,611,621 B2
(45) Date of Patent: Apr. 7, 2020

(54) SPACE-SAVING LIQUID DISPENSING AND FILTRATION CONTAINER

(71) Applicant: Steven Gonzales, Irving, TX (US)

(72) Inventor: Steven Gonzales, Irving, TX (US)

( * ) Notice: Subject to any disclaimer, the term of this patent is extended or adjusted under 35 U.S.C. 154(b) by 0 days.

(21) Appl. No.: 15/605,140

(22) Filed: May 25, 2017

(65) Prior Publication Data

US 2017/0341920 A1    Nov. 30, 2017

Related U.S. Application Data

(60) Provisional application No. 62/341,216, filed on May 25, 2016.

(51) Int. Cl.
| | |
|---|---|
| *B67D 1/08* | (2006.01) |
| *B67D 1/00* | (2006.01) |
| *B67D 3/00* | (2006.01) |
| *C02F 1/00* | (2006.01) |

(52) U.S. Cl.
CPC ......... *B67D 1/0804* (2013.01); *B67D 1/0004* (2013.01); *B67D 1/0801* (2013.01); *B67D 3/0061* (2013.01); *C02F 1/003* (2013.01); *B67D 2001/0094* (2013.01); *B67D 2210/00036* (2013.01); *C02F 2307/10* (2013.01)

(58) Field of Classification Search
CPC .. B67D 1/0804; B67D 1/0004; B67D 1/0892; B67D 2001/0094; B67D 2210/00036; B01D 29/56; C02F 1/00; C02F 2307/10
USPC ......... 222/165, 185.1, 325, 129, 143, 145.1, 222/179.5, 189.06, 189.08, 189.1, 189.11
See application file for complete search history.

(56) References Cited

U.S. PATENT DOCUMENTS

| | | | | |
|---|---|---|---|---|
| 4,143,795 | A * | 3/1979 | Casebier | B67D 3/00 211/126.3 |
| 2006/0237480 | A1* | 10/2006 | Miller | B01F 13/1055 222/132 |
| 2008/0073375 | A1* | 3/2008 | Nelson | B01F 15/0205 222/129 |
| 2017/0232369 | A1* | 8/2017 | Cardones | B01D 35/02 222/189.06 |

* cited by examiner

*Primary Examiner* — Donnell A Long
(74) *Attorney, Agent, or Firm* — Greg N. Geiser; Gutwein Law

(57) ABSTRACT

Described herein is a space saving fluid dispensing container adapted for placement on a shelf. The device is generally adapted for filtration and dispensing of water and designed for placement within the refrigerator. The device includes a base portion forming a cavity and a removable and refillable tank for coupled placement to the base portion and in fluid communication with the base portion cavity for the replenishment of the fluid contents. Accordingly, the base portion is adapted to form a secondary shelf allowing only for the removal of a the refillable tank to allow for easier replenishment of fluid and the saving of space within the area surrounding the shelf the container is placed upon.

17 Claims, 4 Drawing Sheets

SPACE-SAVING LIQUID DISPENSING AND FILTRATION CONTAINER

CROSS REFERENCE TO RELATED APPLICATIONS

This application claims priority to U.S. Provisional Patent Application No. 62/341,216 filed 25 May 2016 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to a space-saving water filtration and dispensing container adapted for placement on a shelf.

BACKGROUND

Currently there are a number of solutions for providing a consumer access to cold, filtered water within a refrigerator. One of most frequent solutions utilized is through the storage of individual bottles within the refrigerator on the shelves, but this solution fails to meet the needs of the market because keeping the bottles cold within the refrigerator requires a large amount of refrigerator space.

Another solution, utilizes a large and generally bulky pitcher having a built in filter that is filled by the user and stored within the refrigerator on the shelves to keep the water cold. This solution is similarly unable to meet the needs of the market because the typical volume of the pitcher is not large enough to accommodate a household of people and therefore the pitchers need to be frequently refilled. Additionally, for the water to be provided cold, the pitcher needs to rest in the refrigerator for an extended period of time after refilling.

Yet another solution provides for a refrigerator with a built in water dispensing unit, but this solution also fail to meet market needs because built in water dispensers increase the cost of the refrigerator and can cause water damage if there are problems with the internal components of the built in dispenser.

Therefore, there is a need within the market for a container adapted for a more permanent placement on a shelf that provides a user with access to cool filtered water. Preferably this device is adapted for use within a refrigeration unit and is configured to maximize space within the refrigeration unit while simultaneously providing a large volume to accommodate multiple users. Still further, preferably the water stored within the device is maintained at a cool temperature, even after refilling.

SUMMARY OF THE INVENTION

It would be advantageous to have an apparatus that provides cold, filtered water without the cost of purchasing bottles of water and without the loss of space in the refrigerator. Furthermore, it would also be advantageous to have an apparatus that has a removable and refillable water tank and a reservoir water tank to insure a constant supply of cold water. Still further, it would be advantageous to have an apparatus that has a shaped design to minimize the space and footprint it occupies on a shelf allowing items to be easily stored in combination with the device.

The invention advantageously fills the aforementioned deficiencies by providing a space saving water filtration and dispensing device for the refrigerator that provides additional water capacity without sacrificing a significant amount of refrigerator shelf space during use.

The invention is comprised of a generally flattened base member having an internal cavity for the placement of fluid and adapted for placement parallel to a refrigerator shelf and a removable and refillable water tank received within the base member without water loss through the combination of a check valve and a valve-docking region, wherein the base member generally provides resting support for various items placed into the refrigerator similar to the shelf the base member is placed upon.

The apparatus has increased water capacity over competitive products.

The apparatus base member interior is generally sloped and forming reservoir tank, which provides constant positive water pressure to a spigot. The spigot is removable to allow for easy rinsing and cleaning of the device base member.

The apparatus fulfills the need for accessible, cold water without taking up a large amount of space in the refrigerator. An "L" shaped design minimizes its footprint within the refrigerator and allows items to be stored within the same space as the unit itself.

Among other things, it is an advantage of the invention to provide a space saving water filtration and dispensing device for the refrigerator that does not suffer from any of the problems or deficiencies associated with prior solutions.

It is still further an advantage of the invention to continue to provide cold water even immediately after refilling.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete, and will fully convey the full scope of the invention to those skilled in the art.

DETAILED DESCRIPTION OF THE INVENTION

Figure 1:
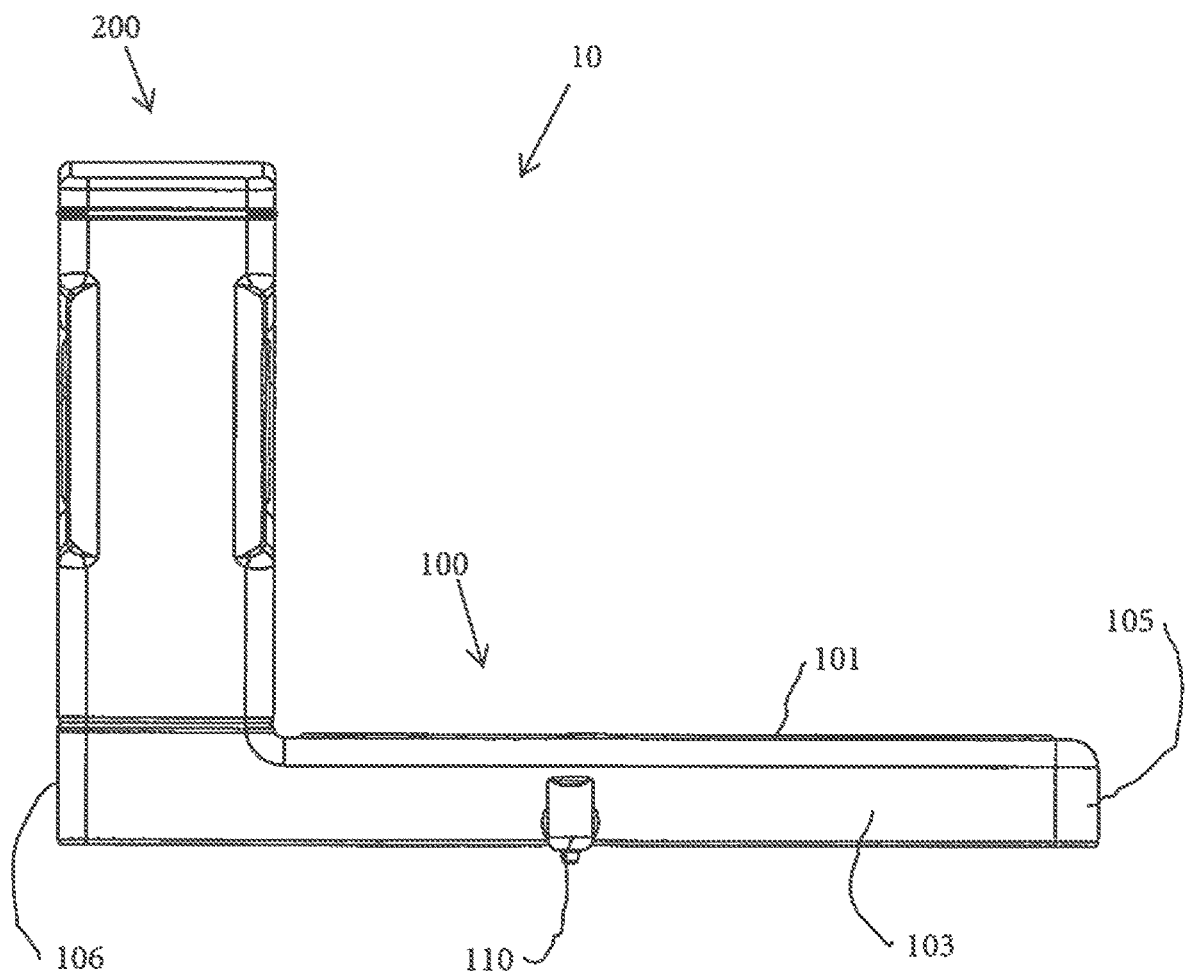
FIG. 1 shows a front side of the device, according to the present invention.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation or one or more preferred embodiments does not imply that other embodiments are not useful, and is not intended to exclude other embodiments from the scope of the invention.

These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention is directed to a liquid dispenser that is designed in such a way, as to permit the storage of items within the same space that the dispenser occupies within a refrigerator and on a shelf.

The dispenser of the present invention, is generally comprised of a base portion having an internal cavity defining a reservoir tank adapted to receive a removable and refillable tank portion coupled to the base portion, wherein the refillable tank is uncoupled, refilled and recoupled to the base portion to replenish the liquid supply. The base portion reservoir tank is constantly replenished with fresh fluids from the refillable tank as liquids are consumed, eliminating the need to remove the entire unit from the refrigerator for refilling. As the liquid within the reservoir tank remains in the refrigerator for dispensing, the water stays cold and the contents placed on top of the base portion do not have to be removed for refilling.

The device of the present invention is preferably provided with an approximate volume of two and one-half (2.5) gallons allowing to hold from 100% to 150% more liquid than a typical combination water pitcher and filter. The device provides improved liquid delivery system for user's looking to maximize their refrigerator space and avoid the frustrating task of having to constantly remove and refill their entire water dispenser to have cold, fresh, and filtered water.

Figure 2:
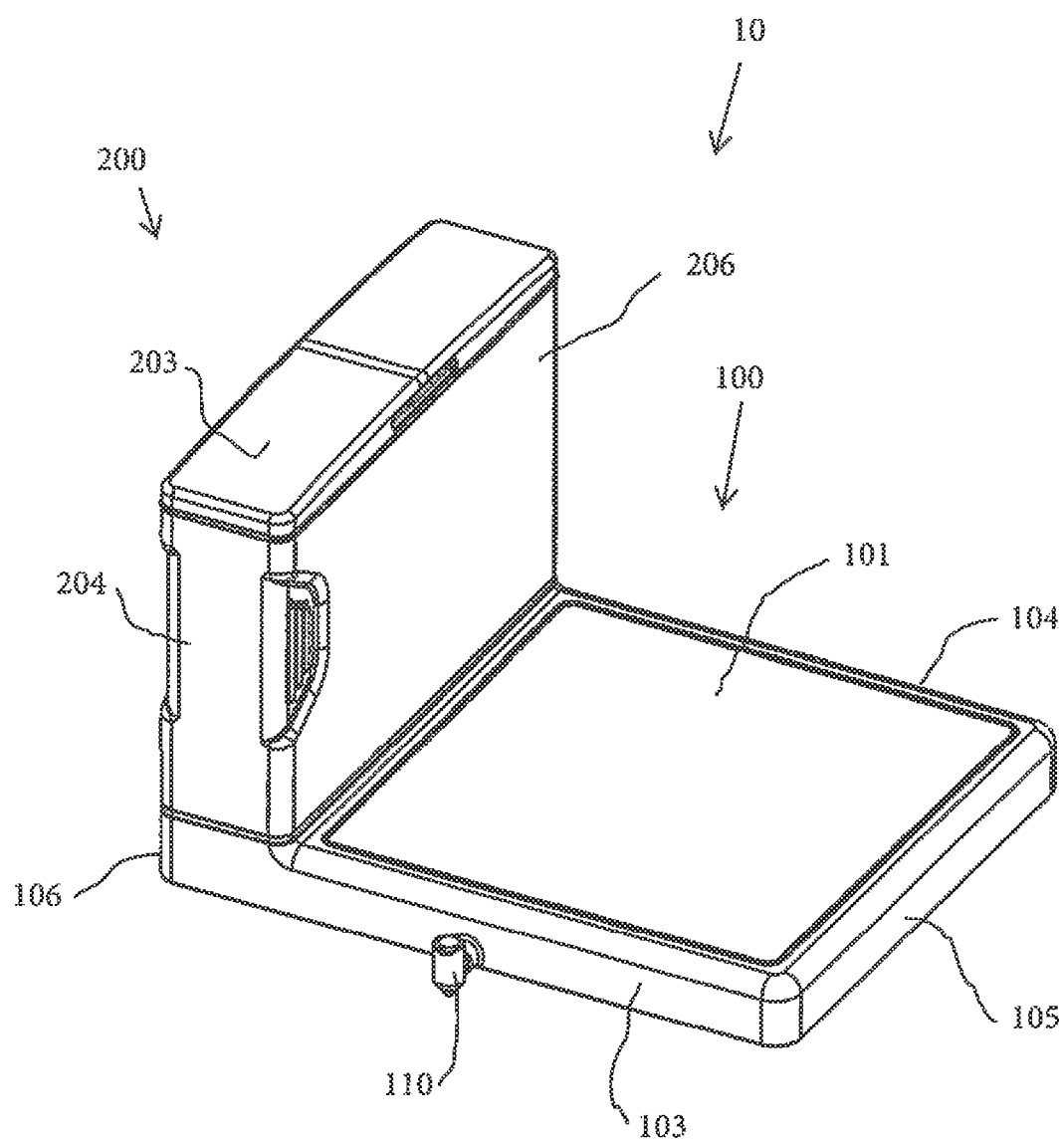
FIG. 2 shows an isometric view of the front of the device, according to the present invention.
Figure 3:
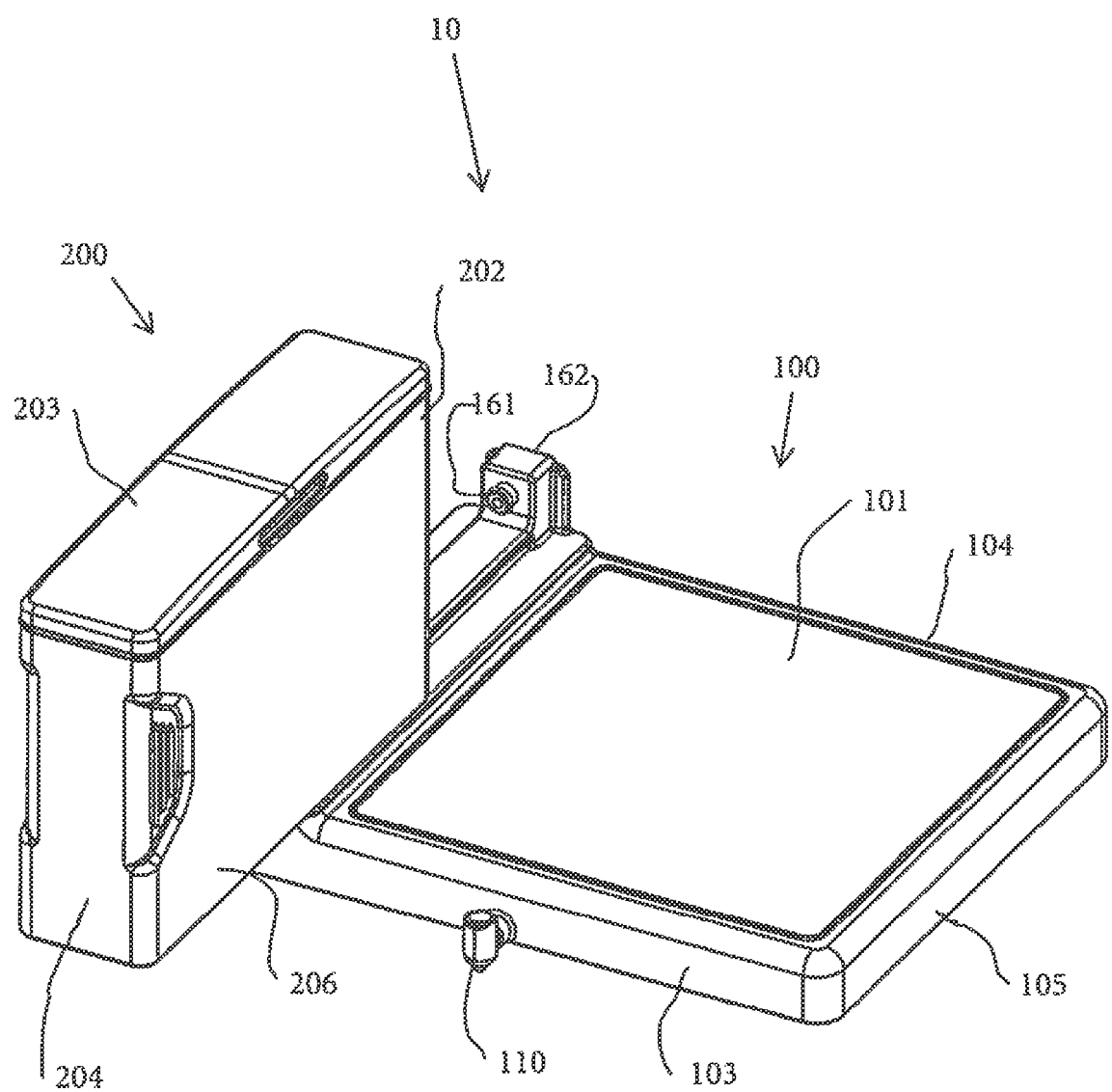
FIG. 3 shows an isometric view of the front side of the device during the docking process, according to the present invention.
Figure 4:
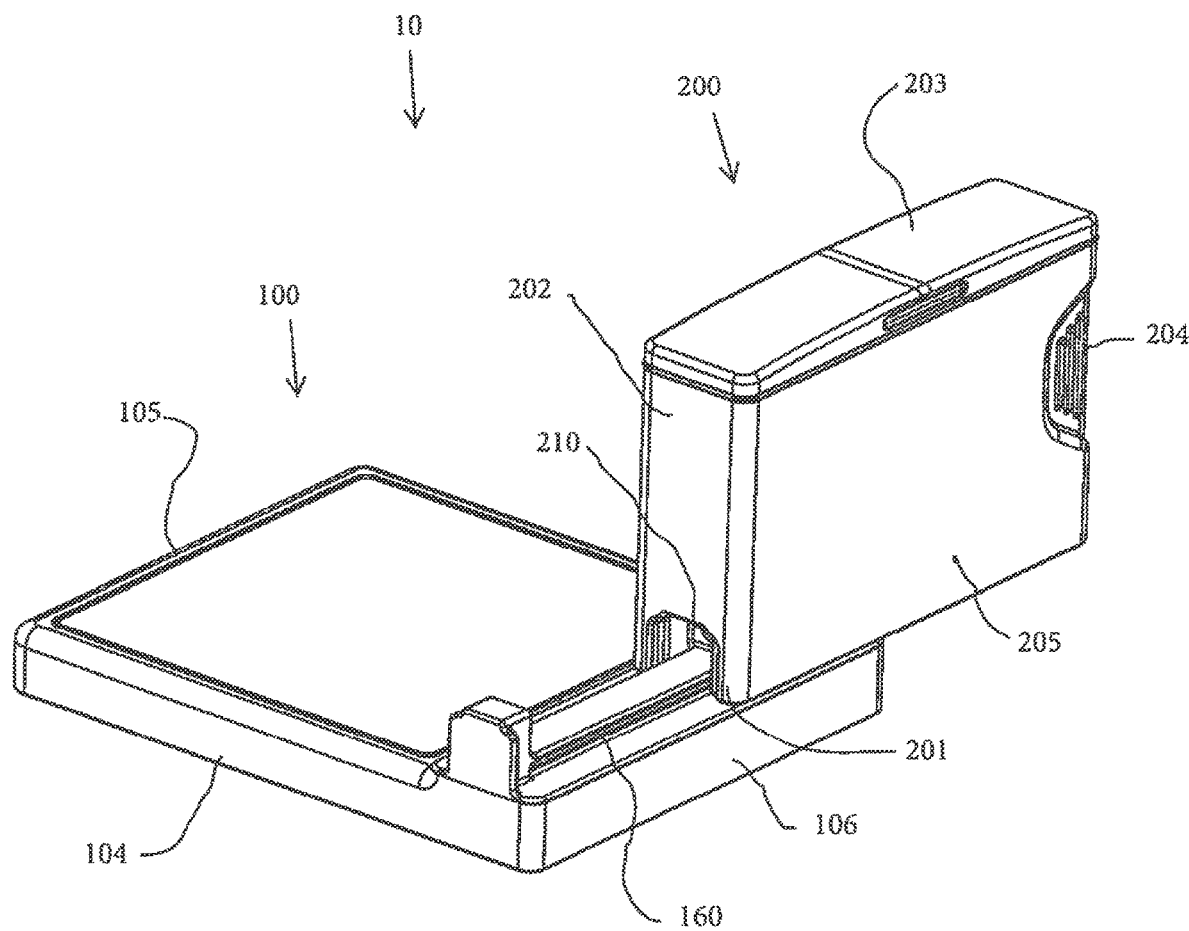
FIG. 4 shows an isometric view of the rear side of the device during the docking process, according to the present invention.

Referring to the figures, FIGS. 1-4 show the space saving liquid dispensing and filtration device according to the present invention and generally referred to as device 10. The device 10 is designed for placement onto a shelf within a refrigerator or more generically onto a shelf and configured to have a minimal impact on the storage capacity of the refrigerator or shelf. Primarily, the device 10 is designed to integrate into the refrigerator and provide a reservoir and source of cold filtered water or liquid for a user.

The device 10 comprises a base portion 100 defining an interior cavity substantially sealed and forming a reservoir adapted to hold a fluid for dispensing and placement on a shelf surface in parallel alignment with the shelf surface and a refillable tank portion 200 removably coupled to the base portion 100 and generally positioned perpendicular to the base portion 100, wherein the base portion 100 generally remains on the shelf during refilling of the removable tank portion 200.

Accordingly, the refillable tank portion 200 and base portion 100 coupling is generally "L-shaped" with the base portion 100 forming the base of the "L-shape" and the refillable tank portion 200 forming the leg of the "L-shape."

The reservoir tank base portion 100 is designed to rest on a shelf, preferably within the refrigerator, and has a top side 101, a bottom side 102, a front side 103, a rear side 104, a right side 105, and a left side 106. Each of the sides 101-106 define the perimeter of the base portion 100 and define a hollow interior cavity forming a reservoir for the placement of a liquid. The hollow interior of the base portion 100 having sufficient dimensions to store a volume of liquid for later dispensing. The interior of the reservoir tank base portion 100 hollow interior having a sloped configuration from the rear side 104 to the front side 103 and from the left side 106 towards the right side 105 ending at a spigot 110 and from the right side 103 towards the left side 106 ending at the spigot 110, wherein liquid placed within the hollow interior will flow towards the front side 103 central location of the base portion 100 interior cavity and in particular to the spigot 110 located near the central location of the front side 103.

The base portion 100 top side 101 and bottom side 102 generally forming planar surfaces positioned parallel to a shelf the base portion 100 is placed upon, the distance between the top side 101 and the bottom side defining a height of the base portion 100. The base portion 100 height, selected at a predetermined amount that is substantially less than a height of the refillable tank portion 200, wherein this configuration forms the "L-shape" and provides for a generally flattened profile of the base portion 100 relative to the refillable tank portion 200.

The spigot 110 allows for the flow of the liquid contents out of the device 10 and into a desired container. The spigot 110 is removably received on the front side 103, preferably through a threaded connection, to allow for the cleaning of the interior cavity of the base portion 100 when desired.

The top side 101 of the base portion may be supported internally through at least one leg to provide strength and rigidity to the top side 101 for the placement of items, wherein the reservoir tank 100 top side 101 functions similar to a shelf.

An engagement surface 160 is located adjacent to the left side 106 along the top side 101. The engagement surface 160 is preferably a track member that allows for the slidable receipt of a corresponding grove on a lower side 201 of the refillable tank portion 200. A valve 161 is located on a stop 162 adjacent the rear side 104 of the reservoir tank and is engaged within an aperture 210 on a rear side 202 of the refillable tank 200, wherein the coupling of the valve 161 within the aperture 210 allows for the flow of liquid from the refillable tank 200 into the reservoir tank 100. The valve 161 only allows for flow in one direction and is positioned to be gravity fed. The valve 161 may include a number of seals or O-rings to create a secure and water tight connection within the aperture 210. The aperture 210 is self-sealing when the valve 161 is disengaged.

The refillable tank 200 includes a top side 203 opposite the bottom side 201, a front side 204 opposite the rear side 202, and a pair of opposed side walls 205, 206. The sides 201, 202, 203, 204, and side walls 205, 206 defining the perimeter of the refillable tank 200 and defining a hollow interior for the receipt of liquid. The top side 203 is preferably a removable lid to allow for easy removal and access to the hollow interior of the refillable tank portion 200 for filling.

The base portion 100 or the refillable tank portion 200 may individually or both include a filter element to clean and purify liquids placed within the device 10 prior to dispensing.

Although the device 10 engagement surface 160 is shown and described as adjacent to the left side 106, it is anticipated that this engagement surface 160 could be positioned adjacent to the right side 105, wherein the refillable tank portion 200 would be positioned on the right side of the device 10 and would be a mirror image of the device 10 depicted. Accordingly, the device 10 could include a pair of engagement surfaces 160 on both the left side 106 and right side 105 of the base portion 100 wherein a pair of refillable tank portions 200 are utilized. To encapsulate the space saving features of the device 10, the refillable tank portion 200 is generally adapted for positioning on an edge of the base portion 100 to conform to the "L-shape" configuration.

For usage an individual will place the device 10 onto a shelf most likely within their refrigerator. The user will then remove the refillable tank portion 200 from the base portion 100 by sliding the refillable tank 200 towards the front side 103 and disengaging the valve 161. The user will then remove the top side 203 from the refillable tank portion 200 and place fluid into the refillable tank portion 200. The user will then slide the refillable tank portion 200 back into the reservoir tank 100 and in engagement with the valve 161 and to the stop 162. Gravity will displace water from the refillable tank portion 200 and into the reservoir tank 100 interior. The user will then use the spigot 110 to receive the liquid contents of the device 10.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed:

1. A container adapted for placement on a shelf for the dispensing of a liquid, the liquid dispensing container comprising:
    a base portion, the base portion adapted to form a cavity for the placement and
        holding of the liquid, the base portion having a continuous planar surface extending across the entire base portion for placement on the shelf and positioned parallel to the shelf it is placed upon;
    a refillable tank portion, the refillable tank portion adapted to form a cavity for the placement of the liquid, the refillable tank portion configured for a removable coupling to a side of the base portion in a fluid communication, wherein fluid flows from the refillable tank portion into the base portion upon coupling, the removable coupling forming a substantially "L-shaped" container with the base portion having a height less than an entire height of the refillable tank portion; and
    a spigot, the spigot positioned on the base portion in communication with the cavity of the base portion, wherein operation of the spigot releases encapsulated liquid within the base portion.

2. A liquid dispensing container as in claim 1, wherein the spigot is removably received on the base portion.

3. A liquid dispensing container as in claim 1, wherein the interior cavity of the base portion is sloped towards the spigot, wherein liquid within the cavity is directed towards the spigot for dispersal.

4. A liquid dispensing container as in claim 1, wherein the interior cavity of the base portion includes at least one supporting member, the supporting member positioned between a top side and a bottom side, the supporting member providing rigidity to the top side, wherein the top side is adapted to form a shelf for the resting support of objects.

5. A liquid dispensing container as in claim 1, wherein the refillable tank portion includes a filter.

6. A liquid dispensing container as in claim 1, wherein the base portion includes a filter.

7. A liquid dispensing container adapted for placement on a shelf defining a shelf height positioned above the shelf and selected for the placement of an object, the dispensing container comprising:
- a base portion, the base portion adapted to form a cavity for the placement and
- holding of the liquid, the base portion having:
  - a top side, the top side forming a generally continuous planar surface positioned parallel to the shelf the base portion is placed upon;
  - a bottom side, the bottom side opposite the top side and forming a generally continuous planar surface positioned parallel to the top side and the shelf the base portion is placed upon, the distance between the top side and the bottom side defining a height of the base portion;
  - a rear side, the rear side in communication with the top side and the bottom side, the rear side generally forming a rear of the base portion;
  - a front side, the front side in communication with the top side and the bottom side opposite the rear side;
  - a left side, the left side in communication with the top side, the bottom side, the front side, and the rear side, the left side generally forming an edge of the base portion;
  - a right side, the right side in communication with the top side, the bottom side, the front side, and the rear side and positioned opposite the left side, the right side generally forming an opposed edge of the base portion, wherein the top side, bottom side, front side, rear side, left side, and right side define the perimeter of the base portion, the perimeter generally having a flattened profile, wherein the height is predetermined to form a base portion that generally does not alter the shelf height above the shelf the base portion is placed upon;
- a refillable tank portion, the refillable tank portion adapted to form a second cavity for the placement of the liquid, the refillable tank portion configured for a removable coupling to a side of the base portion in a fluid communication, the removable coupling forming a substantially "L-shaped" container with the base portion height less than an entire height of the refillable tank portion, wherein fluid flows from the refillable tank portion into the base portion upon coupling; and
- a spigot, the spigot positioned on the base portion front side in communication with the cavity of the base portion, wherein operation of the spigot releases encapsulated liquid within the base portion.

8. A dispensing container as in claim 7, wherein the spigot is removably received on the base portion.

9. A dispensing container as in claim 7, wherein the interior cavity of the base portion is sloped towards the spigot, wherein liquid within the cavity is directed towards the spigot for dispersal.

10. A dispensing container as in claim 7, wherein the interior cavity of the base portion includes at least one supporting member, the supporting member positioned between a top side and a bottom side, the supporting member providing rigidity to the top side, wherein the top side is adapted to form a shelf for the resting support of objects.

11. A dispensing container as in claim 7, wherein the refillable tank portion includes a filter.

12. A dispensing container as in claim 7, wherein the base portion includes a filter.

13. A liquid dispensing container adapted for placement on a shelf defining a shelf height positioned above the shelf and selected for the placement of an object, the dispensing container comprising:
- a base portion, the base portion adapted to form a cavity for the placement and holding of the liquid, the base portion having:
  - a top side, the top side forming a generally continuous planar surface positioned parallel to the shelf the base portion is placed upon;
  - a bottom side, the bottom side opposite the top side and forming a generally continuous planar surface positioned parallel to the top side and the shelf the base portion is placed upon, the distance between the top side and the bottom side defining a height of the base portion;
  - a rear side, the rear side in communication with the top side and the bottom side, the rear side generally forming a rear of the base portion;
  - a front side, the front side in communication with the top side and the bottom side opposite the rear side;
  - a left side, the left side in communication with the top side, the bottom side, the front side, and the rear side, the left side generally forming an edge of the base portion, the left side having a valve;
  - a right side, the right side in communication with the top side, the bottom side, the front side, and the rear side and positioned opposite the left side, the right side generally forming an opposed edge of the base portion, wherein the top side, bottom side, front side, rear side, left side, and right side define the perimeter of the base portion, the perimeter generally having a flattened profile, wherein the height is predetermined to form a base portion that generally does not alter the shelf height above the shelf the base portion is placed upon;
- a refillable tank portion, the refillable tank portion adapted to form a second cavity for the placement of the liquid, the refillable tank portion configured for a removable coupling with the left side of the base portion, the refillable tank portion having an aperture, the aperture adapted to receive the valve in a coupling, the aperture and valve coupling in fluid communication, the base portion and refillable tank portion removable coupling forming a substantially "L-shaped" container with the base portion height less than an entire height of the refillable tank portion, wherein fluid flows from the refillable tank portion into the base portion through the valve; and
- a spigot, the spigot positioned on the base portion front side in communication with the cavity of the base portion, wherein operation of the spigot releases encapsulated liquid within the base portion.

14. A dispensing container as in claim 13, wherein the spigot is removably received on the base portion.

15. A dispensing container as in claim 13, wherein the interior cavity of the base portion is sloped towards the spigot, wherein liquid within the cavity is directed towards the spigot for dispersal.

16. A dispensing container as in claim 13, wherein the interior cavity of the base portion includes at least one supporting member, the supporting member positioned between a top side and a bottom side, the supporting member providing rigidity to the top side, wherein the top side is adapted to form a shelf for the resting support of objects.

17. A dispensing container as in claim 13, wherein the refillable tank portion includes a filter.

* * * * *